(12) United States Patent
Austin et al.

(10) Patent No.: US 6,884,400 B1
(45) Date of Patent: Apr. 26, 2005

(54) REACTION AND REGENERATION SYSTEM

(75) Inventors: Kyle P. Austin, Roselle, IL (US); James A. Szczurek, Arlington Heights, IL (US); Larry D. Richardson, Village of Lakewood, IL (US); David M. Kazell, Libertyville, IL (US); Charles T. Ressl, Mount Prospect, IL (US); Michael J. Vetter, Schaumburg, IL (US); Gary A. Dziabis, Addison, IL (US); Paul R. Cottrell, Arlington Heights, IL (US); Mary Jo Wier, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 644 days.

(21) Appl. No.: 09/887,497

(22) Filed: Jun. 22, 2001

(51) Int. Cl.$^7$ ............................................... F27B 15/08
(52) U.S. Cl. ........................................ 422/216; 422/145
(58) Field of Search ................................ 422/216, 139, 422/141, 142, 143, 144, 145, 147

(56) References Cited

U.S. PATENT DOCUMENTS

| | | | |
|---|---|---|---|
| 2,767,062 A | * 10/1956 | Duecker | 423/576 |
| 3,238,122 A | * 3/1966 | Hagerbaumer | 208/165 |
| 3,647,680 A | 3/1972 | Greenwood et al. | 208/65 |
| 3,725,249 A | * 4/1973 | Vesely et al. | 208/139 |
| 4,048,057 A | 9/1977 | Murphy | 208/89 |
| 4,480,144 A | * 10/1984 | Smith | 585/481 |
| 4,504,459 A | * 3/1985 | Stothers | 423/576.2 |
| 4,567,023 A | 1/1986 | Greenwood et al. | 422/192 |
| 4,578,370 A | * 3/1986 | Greenwood | 502/37 |
| 4,615,792 A | 10/1986 | Greenwood | 208/134 |
| 4,874,585 A | * 10/1989 | Johnson et al. | 422/171 |
| 4,961,907 A | 10/1990 | Herbst et al. | 422/144 |
| 5,500,110 A | 3/1996 | Sechrist et al. | 208/173 |
| 5,584,615 A | 12/1996 | Micklich | 406/109 |
| 5,716,516 A | 2/1998 | Micklich | 208/174 |

FOREIGN PATENT DOCUMENTS

FR    2 160 269 A    6/1973    ........... C10G/39/00

* cited by examiner

*Primary Examiner*—Kiley Stoner
*Assistant Examiner*—Jonathan Johnson
(74) *Attorney, Agent, or Firm*—John G. Tolomei; Michael A. Moore

(57) ABSTRACT

A reactor and regeneration for effecting radial flow contact of a reactant stream with catalyst particles movable as an annular-form bed by gravity flow and for reducing stresses in the bed is disclosed.

12 Claims, 1 Drawing Sheet

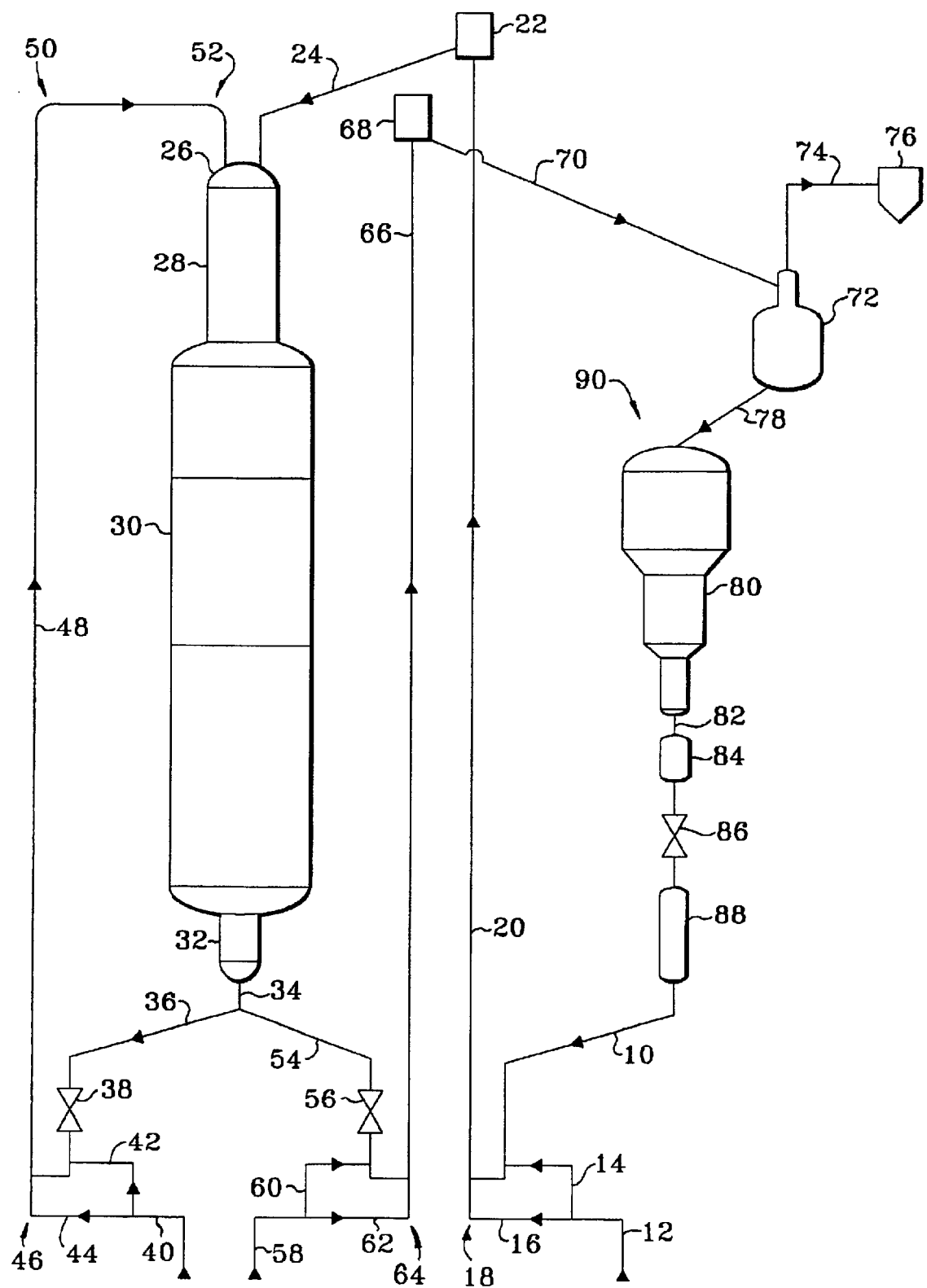

REACTION AND REGENERATION SYSTEM

FIELD OF THE INVENTION

This invention relates to a radial flow catalytic reaction and regeneration system which is useful for hydrocarbon conversion reactions.

BACKGROUND OF THE INVENTION

Reaction and regeneration systems for use in catalytic hydrocarbon conversion processes are well known. Typical systems have at least one reactor and at least one regeneration section. In a reactor, solid catalyst particles promote certain hydrocarbon conversion reactions and at the same time deactivate somewhat. The deactivated catalyst particles are transported to the regeneration section for reactivation, and reactivated catalyst particles are transported back to the reactor.

The reactor is typically a radial flow reactor in which a reactant stream is processed in radial flow through a vertically positioned annular-form catalyst bed in an elongated chamber. Catalyst particles are maintained in a vertically positioned annular-form catalyst retaining section defined by an inner tubular-form catalyst retaining screen (generally supported by a perforated or slotted centerpipe) coaxially disposed within a vertically positioned outer tubular form catalyst retaining screen. The system may use more than one reactor, and each reactor can contain more than one annular-form catalyst bed. Catalyst can flow from one annular-form catalyst bed to the next in a series or parallel flow fashion. Multiple annular-form catalyst beds may be spaced apart from one another either horizontally (e.g., in side-by-side reactors) or vertically (e.g., in a stacked reactor). Each catalyst bed may be a moving packed bed and the particles can move by gravity flow. Illustrative of hydrocarbon conversion processes using such a reactor are catalytic reforming, catalytic dehydrogenation of paraffins, catalytic dehydrogenation of alkylaromatics, and dehydrocyclodimerization of paraffins. For more information on suitable radial flow reactors, see U.S. Pat. Nos. 3,647,680; 3,692,496; 3,864,240; 4,104,149; 4,133,743; 4,167,553; 4,325,806; 4,325,807; 4,567,023; and 5,879,537. The contents of U.S. Pat. No. 4,567,023 are incorporated herein by reference.

The reactants entering the annular-form catalyst bed have been heated and enter at an elevated temperature. The reactants in turn heat the reactor wall, the screens, and the catalyst so that at steady state the entire reactor operates at an elevated temperature. Even so, the temperature within the reactor or the annular-form catalyst bed can vary spatially, depending on whether the reactions taking place are endothermic or exothermic and on heat loss. But, as long as the temperatures are more or less constant, such temperature differences are not problematic, and are routinely accommodated for in the mechanical design of the reactor. Likewise, raising and lowering the temperatures within the reactor cause no particular difficulties with the mechanical integrity of the reactor, provided that heating and cooling is done gradually or in a controlled manner and provided, that the magnitude of the temperature change is not excessive. Then, the reactor wall, the screens, and catalyst are able to expand or contract relative to each other and according to their thermal expansion coefficients in such a way that the volume of the catalyst bed is essentially constant, the amount of catalyst in the catalyst bed is essentially constant, and no mechanical failure occurs inside the reactor.

Very rapid, uncontrolled, or non-uniform heating and cooling or a large magnitude cooling event is quite different, however. If the reactor is initially at steady state and an elevated temperature, a loss of flow of reactants can cause extreme transient differences in the volume of the catalyst bed containing a fixed amount of catalyst. The inner screen can cool sooner and faster than the wall, which can cause the bed volume to expand. This can let more catalyst enter the bed, since the bed is fed by gravity flow. Once the walls also begin to cool, however, the bed volume can contract and the bed pressure can rise, since the bed now contains more catalyst than before. This interparticle stress in turn can exert tremendous forces on the inner and outer screens, which can collapse or crack under extreme loads. A shutdown of the heater for the reactants entering the reactor can have the same effect.

A reaction and regeneration system is described in U.S. Pat. No. 3,647,680. More specifically, the figure in U.S. Pat. No. 3,647,680 shows an annular-form bed 13, a lock hopper 22, a lift engager 25, and a disengaging hopper 28. This system can be used to reduce the bed pressure and relieve the stress on the screens in the annular-form bed 13 by withdrawing catalyst particles from the bottom of the bed 13 and transporting them via lock hopper 25 and lift engager 25 to disengaging hopper 28. This system has several disadvantages, however. First, when the conditions in the reactor are changing rapidly, this system transports catalyst particles from the reactor to the regeneration section, even though it would be better for the operation of the regeneration section to transfer those catalyst particles somewhere else. Second, this system transports catalyst particles to the regeneration section even when the regeneration section is shutdown, since the same circumstances that cause rising reactor bed pressures often cause regeneration section shutdowns as well. Therefore, other reaction and regeneration systems that reduce bed pressures are sought.

SUMMARY OF THE INVENTION

A reactor and regeneration system for reducing stresses in a gravity-flowing annular-form bed of catalyst particles in a reactor without any net transfer of catalyst particles out of the reactor is disclosed. This system has means for transferring catalyst particles from a reactor outlet to a reactor inlet that is higher up in the reactor. This system relieves stresses in the bed without transferring a net quantity of catalyst particles to the regeneration section. This system is capable of reducing stresses in the annular-form bed, even when the regeneration section is shutdown.

Accordingly, a reaction and regeneration system to effect radial flow contact of a reactant stream with catalyst particles movable as an annular-form bed through the system by gravity flow and to reduce stresses in the bed is disclosed. The system comprises a reactor having an annular-form catalyst retaining section. The catalyst retaining section has an upper portion and a lower portion disposed below the upper portion. A first catalyst inlet port is in communication with the upper portion of the catalyst retaining section. A first catalyst outlet port is in communication with the lower portion of the catalyst retaining section. A regeneration section to at least partially rejuvenate catalyst particles is in communication with the first catalyst outlet port to receive catalyst particles from the catalyst retaining section and also in communication with the first catalyst inlet port to introduce catalyst particles to the catalyst retaining section. A second catalyst outlet port is in communication with the lower portion of the catalyst-retaining section. A second catalyst inlet port is in communication with the upper portion of the catalyst-retaining section. A means for transferring catalyst from the second catalyst outlet port to the second catalyst inlet port is in communication with the second catalyst outlet port and the second catalyst inlet port. The means for transferring catalyst is not for introducing catalyst particles to the regeneration section.

Also disclosed is a reaction and regeneration system to effect radial flow contact of a reactant stream with catalyst particles movable as an annular-form bed through the system by gravity flow and to reduce stresses in the bed. The system comprises a chamber having vertical chamber walls. The chamber is vertically elongated and confined. An outer catalyst retaining screen is disposed within the chamber. The outer catalyst retaining screen is vertically positioned and tubular-form. An inner catalyst retaining screen is coaxially disposed within the outer catalyst retaining screen to form a catalyst retaining section. The inner catalyst retaining screen is enclosed and tubular-form. The catalyst retaining section is annular-form and has an outer manifold space around the exterior thereof The outer manifold space is defined by the chamber walls and the outer catalyst retaining screen. The catalyst retaining section also has an inner manifold space defined by the inner catalyst retaining screen, and the catalyst retaining section is around the exterior of the inner manifold space. The catalyst retaining section has an upper portion-and also a lower portion, both defined by the inner and outer catalyst retaining screens. The lower portion is disposed below the upper portion. A reactant inlet port is in communication with the outer manifold space. A reactant outlet port is in communication with the inner manifold space. A first catalyst inlet port is in communication with the upper portion of the catalyst retaining section. A first catalyst outlet port is in communication with the lower portion of the catalyst retaining section. A regeneration section to at least partially rejuvenate catalyst particles is in communication with the first catalyst outlet port to receive catalyst particles from the catalyst retaining section. The regeneration section is also in communication with the first catalyst inlet port to introduce catalyst particles to the catalyst retaining section. A second catalyst outlet port is in communication with the lower portion of the catalyst-retaining section. A second catalyst inlet port is in communication with the upper portion of the catalyst-retaining section. A means for transferring catalyst from the second catalyst outlet port to the second catalyst inlet port is in communication with the second catalyst outlet port and the second catalyst inlet port. The means for transferring catalyst is not for introducing catalyst particles to the regeneration section.

Other embodiments of this reaction and regeneration system are disclosed in the detailed description.

INFORMATION DISCLOSURE

U.S. Pat. Nos. 3,647,680 and 5,500,110 describe reactor and regeneration systems.

U.S. Pat. Nos. 5,584,615 and 5,716,516 describe pneumatic and gravity transport of particulate material using nonmechanical valves and impactless flow diverters.

U.S. Pat. No. 4,567,023 describes a multi-stage reactor system for affecting radial flow contact of a moving catalyst bed.

BRIEF DESCRIPTION OF THE DRAWING

The drawing is a process flow diagram showing a reaction and regeneration system that is an embodiment of the invention.

DETAILED DESCRIPTION OF THE INVENTION

The reaction and regeneration system disclosed herein can be applied to any radial flow contacting reactor wherein particles move by gravity flow through an annular-form bed. It is particularly applicable to reactors for radial-flow (inward or outward) contacting of catalyst particles in processes in which transient conditions cause extreme interparticle pressures in the annular-form bed at certain times. The times when this is especially applicable are those when catalyst particles can not or should not be transferred from the reactor to a section for regeneration of the catalyst particles. The most common type of process for which this system may be used is hydrocarbon conversion processing, including catalytic reforming, catalytic dehydrogenation of paraffins, catalytic dehydrogenation of alkylaromatics, and dehydrocyclodimerization of paraffins.

The most widely practiced hydrocarbon conversion process to which the present invention is applicable is catalytic reforming. Therefore, the discussion of the invention herein will refer to its application to a catalytic reforming reaction system. It is not intended that this limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline.

The art of catalytic reforming is well known and does not require detailed description herein. Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII (IUPAC 8–10) noble metals (e.g., platinum, iridium, rhodium, palladium) and a halogen combined with a porous carrier, such as a refractory inorganic oxide. The halogen is normally chlorine. Alumina is a commonly used carrier. The catalyst may comprise other metals including metals in Group I B through Group VII B (IUPAC 11–12, and 3–7), including molybdenum, rhenium, zirconium, chromium, and manganese, and metals in Group I A through Group VI A (IUPAC 1–2, and 13–16), including potassium, calcium, magnesium, aluminum, gallium, germanium, indium, tin, and lead.

The catalyst particles are usually spheroidal and have a diameter of from about $\frac{1}{16}$th to about $\frac{1}{8}$th inch (1.6–3.2 mm), though they may be as large as $\frac{1}{4}$th inch (6.4 mm). In a particular reaction-regeneration system, however, it is desirable to use catalyst particles which fall in a relatively narrow size range. A common catalyst particle diameter is 1/16th inch (1.6 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reactivated, or reconditioned, or regenerated, before it can be reused in a reforming process.

In a common form, the reformer will employ a moving bed reaction zone and a regeneration section. The reaction and regeneration system of the present invention is applicable to either a moving bed regeneration section or a fixed bed regeneration section. Fresh catalyst particles are fed to a reaction zone, which may be comprised of several reactors, and the particles flow through the zone by gravity. Catalyst is withdrawn from the bottom of the reaction zone and transported to a regeneration section where a multi-step regeneration process is used to remove the coke deposits and reactivate the catalyst to restore its full reaction promoting ability. The art of moving bed regeneration sections is well known and does not require detailed description herein. Catalyst flows by gravity through the various regeneration steps and then is withdrawn from the regeneration section and furnished to the reaction zone. Movement of catalyst through the reaction zone and the regeneration section is often referred to as continuous though, in practice, it may be semicontinuous. By semi-continuous movement it is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

The drawing shows a reaction and regeneration system that is an embodiment of the present invention. This reaction and regeneration system is similar to the system shown in FIG. 2 of U.S. Pat. No. 5,500,110, the contents of which are incorporated herein by reference. Therefore, it is not necessary to describe the drawing in detail. Briefly, an arrangement of stacked reactors 30 is in communication with a lower retention chamber 32 for withdrawing catalyst particles from the reactors 30.

The arrangement of stacked reactors 30 is similar to the multiple-stage reactor system described in U.S. Pat. No. 4,567,023, the contents of which are incorporated herein by reference. The stacked reactors 30 are not described herein in detail, nor are their internals shown in the drawing. But each of the reactors (stages) has an elongated chamber, a vertical chamber wall, an outer catalyst retaining screen (which may comprise a group of scalloped-shaped elements), an inner catalyst retaining screen, an annular-form catalyst retaining section, an outer manifold space around the exterior of the outer screen, an inner manifold space surrounded by the inner screen and catalyst retaining section, a reactant inlet port in communication with the outer or inner manifold space, and a reactant outlet port in communication with the inner or outer manifold space.

The arrangement of stacked reactors 30 preferably has a lower retention chamber 32, which can receive catalyst particles flowing downward from a lower portion of the catalyst retaining section of the bottom reactor. Lower retention chamber 32 has an inlet port (not shown) for hydrogen gas for purging the hydrocarbons from the catalyst particles in lower retention chamber 32. Lower retention chamber 32 allows hydrogen gas to flow upward into the bottom reactor. Conduit 34 is connected by a port or nozzle (not shown) to lower retention chamber 32 and by a "Y" fitting to two conduits—conduit 54 for transferring catalyst particles to regeneration section 90 and conduit 36 for transferring catalyst particles to the top 26 of surge chamber 28 for relieving bed pressure in reactors 30. During stable and steady operation of reactors 30, catalyst particles are transferred to regeneration section 90 (generally denoted in the drawing), and valve 56 in conduit 54 is fully open. Conduit 54 displaces hydrogen and hydrocarbon from the catalyst particles. Conduit 54 is connected to non-mechanical valve 64, which regulates the transport of catalyst particles into conduit 66 using regulating gas (e.g., nitrogen) from conduits 58 and 60. Conduits 58 and 62 deliver lifting gas (nitrogen) to non-mechanical valve 64 for transporting catalyst particles up conduit 66. Non-mechanical valves are well known, and further information is in "L Valves Characterized for Solid Flow," *Hydrocarbon Processing*, March 1978, pages 149–156; *Gas Fluidization Technology*, edited by D. Geldart (John Wiley & Sons, 1986); and U.S. Pat No. 4,202,673, the contents of all of which are incorporated herein by reference. A low impact diverter 68 is at the top of conduit 66. Low impact diverters are well known, and further information is in U.S. Pat. Nos. 5,584,615 and 5,716,516, the contents of which are incorporated herein by reference.

Conduit 70 transports catalyst particles from diverter 68 to disengaging hopper 72, which separates broken or chipped catalyst particles from whole catalyst particles using elutriation gas (e.g., nitrogen). Conduit 74 transfers catalyst chips and fines to a bag dust collector 76. Conduit 78 transfers catalyst particles to regeneration vessel 80 for reactivating catalyst particles. The details of regeneration vessel 80 and of the reactivation method depend on the catalyst particles. Conduit 82, seal drum 84, valve 86, and lock hopper 88 control catalyst transfer from regeneration vessel 80 and also displace from catalyst particles the gases used in catalyst reactivation. Seal drums and lock hoppers are well known.

Conduit 10 transfers catalyst particles to non-mechanical valve 18, which regulates the transport of catalyst particles into conduit 20 using regulating gas (e.g., hydrogen) from conduits 12 and 14. Conduits 12 and 16 deliver lifting gas (hydrogen) to non-mechanical valve 18 for transporting catalyst particles up conduit 20 to low impact diverter 22. Conduit 24 transports catalyst particles from diverter 22 to a port or nozzle (not shown) at the top 26 of surge chamber 28 so that catalyst particles enter surge chamber 28.

When conditions in reactors 30 are changing rapidly, there is a need for bed pressures and stresses to be relieved. But, even though some catalyst particles must be withdrawn from the reactor, those catalyst particles often can not be transferred to the regeneration section because, for example, the regeneration section is shutdown or the catalyst particles are insufficiently purged of hydrocarbon. To prevent transfer of catalyst particles to regeneration section 90, valve 56 in conduit 54 can be shut completely. To reduce bed pressures and stresses in reactors 30, the reaction and regeneration system has means for transferring catalyst particles from the bottom of reactors 30 to a point higher up in the reactors 30 or in surge chamber 28. This means is not for transferring catalyst particles to regeneration section 90. The drawing shows one such means. Valve 38 in conduit 36, which can be closed during steady and stable operation of reactors 30, can be fully opened to permit catalyst transfer to the top 26 of surge chamber 28. Conduit 36 is connected to nonmechanical valve 46, which regulates the transport of catalyst particles into conduit 48 using regulating gas (e.g., nitrogen) from conduits 40 and 42. Conduits 40 and 44 deliver lifting gas (nitrogen) to non-mechanical valve 46 for transporting catalyst particles up conduit 48 to a port or nozzle (not shown) at the top 26 of surge chamber 28 so that catalyst particles enter surge chamber 28. Conduit 48 has two long-radius (e.g., 4ft (1.2 m) radius) bends, 50 and 52.

When conditions in reactors 30 require bed pressures and stresses to be relieved, catalyst movement through conduit 36 and valve 38 can be continuous though, in practice, it may be semicontinuous. By semi-continuous movement it is meant the repeated transfer of relatively small amounts of catalyst particles at closely spaced points in time. For example, valve 38 could be equipped with a simple timer and position indicators to control its opening and closing. The timer settings could be adjustable so that valve 38 is opened once every twenty minutes and kept open for three minutes, that is catalyst will flow for three minutes in twenty minute intervals. Another possibility is that conduit 36 could contain two valves (rather than a single valve) spaced apart with a volume in-between that corresponds to a batch of catalyst particles. Both two valves could be equipped with simple timers and position indicators to control their opening and closing. Timer settings could be adjustable so that one batch per twenty minutes may be withdrawn from the bottom of the reactors and withdrawal may take three minutes, that is, catalyst will flow for three minutes.

The means for transferring catalyst particles should have a capacity of transferring, within a time period of 12 hours or less, a quantity of catalyst particles equal to about 3.5% of the quantity of the catalyst particles in the catalyst bed whose pressure or stresses must be reduced. The actual capacity of the means for transferring catalyst particles should be adjustable by a person of ordinary skill in the art to transfer catalyst particles from the catalyst bed at the rate necessary to relieve the bed pressure or stresses. Preferably, the surge chamber 28 capacity should be large enough to contain from about 3.5% to about 5% of the quantity of the catalyst particles in the catalyst bed whose pressure or stresses must be reduced.

Other means of transferring catalyst particles from the bottom of the reactors 30 to a point higher up in reactors 30 or in surge chamber 28 are possible, including screw conveyors, belt conveyors, bucket elevators, vibrating or oscillating conveyors, continuous-flow conveyors, and other pneumatic conveyors including lift engagers as illustrated in U.S. Pat. No. 3,647,680, for example. Selection of the means for tansferring catalyst particles depends on many variables. See pages 21–4 to 21–27 in *Perry's Chemical Engineers' Handbook*, 7$^{th}$ ed. (McGraw-Hill, 1997), which are incorporated herein by reference.

Possible variations on the reaction and regeneration system shown in the drawing are within the scope of the claims. One possibility is that conduits 52 and 24 could feed catalyst particles into surge chamber 28 via a single inlet port (e.g., nozzle) rather than through separate inlet ports. Another is that conduits 36 and 54 could withdraw catalyst particles from separate outlet ports (e.g., nozzles) in lower retention chamber 32 instead of from a single outlet port and its associated conduit 34 as shown in the drawing. A third possibility is that the surge chamber 28 could be located within one of the reactors 30, especially the uppermost reactor. A fourth is that the reaction and regeneration system could have a zone for reducing catalytic metals, particularly if the method of catalyst reactivation in the regenerator vessel 80 includes oxidizing catalytic metals. Such a reduction zone may be located above or below the surge chamber 28 or may include the surge chamber 28. A fifth possibility is that, instead of multiple reactors, there could be only a single reactor (stage) between surge chamber 28 and lower retention chamber 32.

Preferably, the reactor and regeneration system monitors the catalyst quantity that is transferred to regeneration section 90 after the end of catalyst transfer to surge chamber 28 by non-mechanical valve 46. This monitoring may involve simply multiplying the number of cycles of lock hopper 88 (starting when transfer to regeneration section 90 resumed) by the lock hopper's load size. When that multiplication product equals the catalyst quantity in the surge chamber 28, reactors 30, and lower retention chamber 32 that is beneath the catalyst transferred by non-mechanical valve 46, the system informs the operator of regeneration vessel 80 that catalyst that was transferred by non-mechanical valve 46 is about to enter regeneration vessel 80. Because this catalyst passed twice (rather than only once) through reactors 30, it may have sustained additional deactivation (e.g., more coke) and the operating conditions of regeneration vessel 80 may need to be adjusted accordingly.

What is claimed is:

1. A reaction and regeneration system to effect radial flow contact of a reactant stream with catalyst particles movable as an annular-form bed through the system by gravity flow and to reduce stresses in the bed, the system which comprises:
   a) a reactor having a catalyst retaining section, the catalyst retaining section being annular-form, the catalyst retaining section having an upper portion and a lower portion disposed below the upper portion;
   b) a first catalyst inlet port in communication with the upper portion of the catalyst retaining section;
   c) a first catalyst outlet port in communication with the lower portion of the catalyst retaining section;
   d) a regeneration section to at least partially rejuvenate catalyst particles, the regeneration section being in communication with the first catalyst outlet port to receive catalyst particles from the catalyst retaining section and in communication with the first catalyst inlet port to introduce catalyst particles to the catalyst retaining section;
   e) a second catalyst outlet port in communication with the lower portion of the catalyst retaining section;
   f) a second catalyst inlet port in communication with the upper portion of the catalyst retaining section; and
   g) a means for transferring catalyst from the second catalyst outlet port to the second catalyst inlet port, the means not being for introducing catalyst particles to the regeneration section, the means being in communication with the second catalyst outlet port and the second catalyst inlet port.

2. The system of claim 1 wherein the means for transferring catalyst comprises a non-mechanical valve.

3. The system of claim 1 wherein the means for transferring catalyst comprises a low impact diverter.

4. The system of claim 1 wherein the means for transferring catalyst is not for receiving catalyst particles from the regeneration section.

5. The system of claim 1 wherein the first catalyst inlet port and the second catalyst inlet port are the same port.

6. The system of claim 1 wherein the first catalyst outlet port and the second catalyst outlet port are the same port.

7. The system of claim 1 wherein the catalyst retaining section has a capacity of retaining a quantity of catalyst and the means for transferring catalyst has a capacity of transferring 3.5% of the quantity of catalyst in 12 hours or less.

8. The system of claim 1 further comprising a catalyst surge section, the catalyst surge section being in communication with the second catalyst inlet port to receive catalyst particles from the means for transferring catalyst and with the upper portion of the catalyst retaining section to introduce catalyst particles by gravity flow to the catalyst retaining section.

9. The system of claim 1 further comprising a catalyst surge section, the catalyst surge section being in communication with the means for transferring catalyst and with the second catalyst inlet port to introduce catalyst particles by gravity flow to the catalyst retaining section.

10. The system of claim 1 further characterized in that the reactor has at least two vertically spaced apart reactor sections and a means for transferring catalyst from the upper of the at least two reactor sections to the lower of the at least two reactor sections.

11. A reaction and regeneration system to effect radial flow contact of a reactant stream with catalyst particles movable as an annular-form bed through the system by gravity flow and to reduce stresses in the bed, the system which comprises:

a) a chamber having vertical chamber walls, the chamber being vertically elongated and confined;

b) an outer catalyst retaining screen disposed within the chamber, the outer catalyst retaining screen being vertically positioned and tubular-form;

c) an inner catalyst retaining screen coaxially disposed within the outer catalyst retaining screen to form a catalyst retaining section, the inner catalyst retaining screen being enclosed and tubular-form, the catalyst retaining section being annular-form, the catalyst retaining section having an outer manifold space around the exterior thereof as defined by the chamber walls and the outer catalyst retaining screen, the catalyst retaining section having an inner manifold space defined by the inner catalyst retaining screen, the catalyst retaining section being around the exterior of the inner manifold space, the catalyst retaining section having an upper portion defined by the inner and outer catalyst retaining screens, and a lower portion defined by the inner and outer catalyst retaining screens disposed below the upper portion;

d) a reactant inlet port in communication with the outer manifold space;

e) a reactant outlet port in communication with the inner manifold space;

f) a first catalyst inlet port in communication with the upper portion of the catalyst retaining section;

g) a first catalyst owlet port in communication with the lower portion of the catalyst retaining section;

h) a regeneration section to at least partially rejuvenate catalyst particles, the regeneration section being in communication with the first catalyst outlet port to receive catalyst particles from the catalyst retaining section and in communication with the first catalyst inlet port to introduce catalyst particles to the catalyst retaining section;

i) a second catalyst outlet port in communication with the lower portion of the catalyst retaining section;

j) a second catalyst inlet port in communication with the upper portion of the catalyst retaining section; and k) a means for transferring catalyst from the second catalyst outlet port to the second catalyst inlet port, the means not being for introducing catalyst particles to the regeneration section, the means being in communication with the second catalyst outlet port and the second catalyst inlet port.

12. The system of claim 11 further characterized in that the outer catalyst retaining screen comprises scalloped-shaped elements.

\* \* \* \* \*

UNITED STATES PATENT AND TRADEMARK OFFICE
CERTIFICATE OF CORRECTION

PATENT NO. : 6,884,400 B1
DATED : April 26, 2005
INVENTOR(S) : Kyle P. Austin et al.

It is certified that error appears in the above-identified patent and that said Letters Patent is hereby corrected as shown below:

Column 10,
Line 15, the word "owlet" should be replaced with the word -- outlet --.

Signed and Sealed this

Twenty-eighth Day of June, 2005

JON W. DUDAS
*Director of the United States Patent and Trademark Office*